US012744792B1

(12) United States Patent
Mitchell

(10) Patent No.: US 12,744,792 B1
(45) Date of Patent: Sep. 22, 2026

(54) TRAINING MACHINE LEARNING MODELS FOR RESPONDING TO SECURITY THREATS

(71) Applicant: Rapid7, Inc., Boston, MA (US)

(72) Inventor: Opal Mitchell, Pawtucket, RI (US)

(73) Assignee: Rapid7, Inc., Boston, MA (US)

( * ) Notice: Subject to any disclaimer, the term of this patent is extended or adjusted under 35 U.S.C. 154(b) by 366 days.

(21) Appl. No.: 18/409,894

(22) Filed: Jan. 11, 2024

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1441* (2013.01)

(58) Field of Classification Search
CPC .. H04L 63/1416; H04L 63/1441; G06N 20/00
See application file for complete search history.

(56) References Cited

U.S. PATENT DOCUMENTS 10,419,450 B2 * 9/2019 Muddu .................. G06N 20/20
11,544,374 B2 1/2023 Mitelman
11,562,088 B2 * 1/2023 Levy ....................... G06F 21/45
11,606,379 B1 * 3/2023 Pratt ................... H04L 63/1425
11,637,858 B2 * 4/2023 Wojnowicz ........... H04L 63/145 726/23
2012/0240185 A1 * 9/2012 Kapoor ............... H04L 41/0866 726/1
2018/0367561 A1 12/2018 Givental et al.
2020/0202184 A1 * 6/2020 Shrestha .................. G06N 3/09
2021/0273961 A1 9/2021 Humphrey et al.
2022/0253526 A1 * 8/2022 Sanders ................ G06F 21/564
2022/0407889 A1 * 12/2022 Narigapalli ........... H04L 63/101
2023/0105087 A1 * 4/2023 Borges ................ H04L 63/1425 726/23

* cited by examiner

*Primary Examiner* — Amir Mehrmanesh
*Assistant Examiner* — Thomas A Gyorfi
(74) *Attorney, Agent, or Firm* — Ashwin Anand

(57) ABSTRACT

A security threat detection and response (STDR) system is disclosed capable of recommending actions for handling security events detected in a computer network. In embodiments, user actions taken via the graphical user interface of the system are recorded. The records are used as training data to train a machine learning model to recommend actions for different types of security events to subsequent users. The training may be performed online, so that the model continues to learn while it is used to make recommendations. In embodiments, the model may infer a priority of a recommended action based on observation data such as how quickly an action is taken, the order in which actions are taken, and the popularity of the action for the particular security event. In embodiments, the model may be configured to recommend actions that are new to the system or actions for new types of security events.

20 Claims, 11 Drawing Sheets

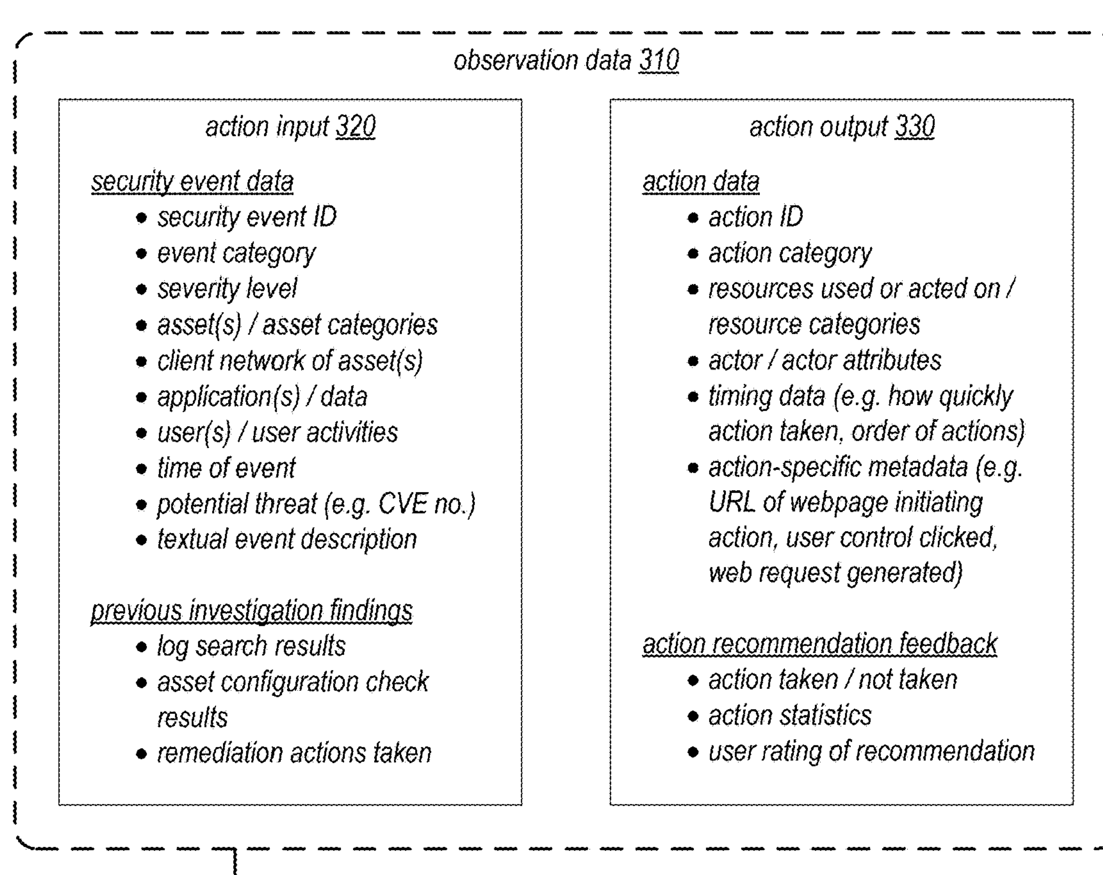
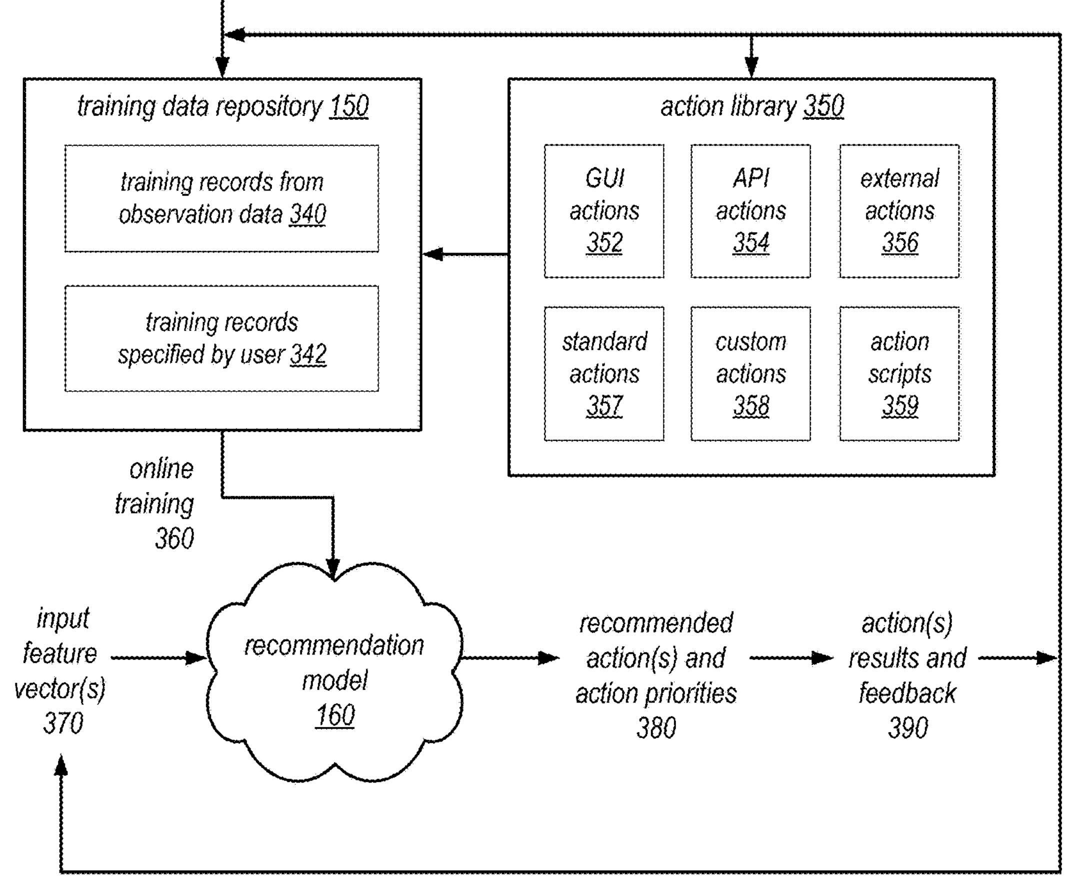
FIG. 3

Security Alert Review 500

Alert: Suspicious User Behavior 510

| | |
|---|---|
| Alert Type: | Potential phishing attempt / email client |
| Network: | Company XYZ (Boston) |
| Asset: | J-Brown Workstation (11.22.33.45) |
| User: | Juan Brown |
| Details: | Outbound connection to known malicious address (33.66.77.89) |
| Date (Time): | October 31, 2023 (4:50 pm EST) |
| Status (Analyst): | Investigating (Opal Mitchell) |

View Asset Logs

Contextual Data

Comment

Remediate

Recommended Actions 520

| Action Scripts 522 | Priority 524 | Take Action 526 |
|---|---|---|
| Examine asset connection logs to review data exchanged over connection | 9 / 10 | **Run Now** |
| Examine asset process logs for malware executables | 8 / 10 | **Run Now** |
| Notify user regarding phishing attempt | 8 / 10 | **Run Now** |
| Add user / machine to closely monitored set; perform full scan of machine | 5 / 10 | **Run Now** |

Take Another Action

Provide Feedback

*FIG. 5A*

Connection Log Search 530

Connection Log Query: 532

Asset: J-Brown Workstation (11.22.33.45)

Query: Show events 'Connection' or 'Disconnection' to '33.66.77.89' on '2023-10-31'

Run Query

Query Results 540

| ID | Date / Time | Event | Details |
|---|---|---|---|
| 33022 | 2023-10-31 4:50:00 | Connection established | IP: 33.66.77.89; port: 2445; **PID: 9143** |
| 33025 | 2023-10-31 4:50:01 | Disconnection | Time: 3 seconds; data downloaded: 25K |
| 33047 | 2023-10-31 4:52:14 | Connection established | IP: 33.66.77.89; port: 3666; **PID: 9143** |
| 33059 | 2023-10-31 4:52:54 | Disconnection | Time: 40 seconds; data downloaded: 2.42M |

*automatic highlight 542*

Action Steps 550

- Copy asset address
- Copy external address
- Navigate to query page
- Execute log query
- Look at data downloaded attribute in query results, look suspicious?
  - Yes
  - No
- Add comment in event findings (Run Now)

Next Recommended Actions 560

FIG. 5B

TRAINING MACHINE LEARNING MODELS FOR RESPONDING TO SECURITY THREATS

BACKGROUND

A Managed Detection and Response (MDR) service is a service that relies on the expertise of security analysts to monitor metadata of a computer network to detect and respond to security threats. The MDR service works by collecting large volumes of data about computers on a client network and presenting the data to security analysts to be examined for signals indicating compromise of the computers or security policy violations. Security events are identified and presented via a Security Information and Event Management (SIEM) system, which provides user interfaces to allow analysts to take responsive actions on the events (e.g. investigative actions or threat remediation actions).

Current SIEM systems provide analysts limited instructions on how to deal with different types of security events. These instructions are typically provided at a very high level, using generalized language such as "analyze files written to asset within a short time window after antivirus protection was disabled" or "review process execution timeline on the asset to identify attacker related activity." These instructions are not readily translatable to a set of concrete executable steps that can be taken within the SIEM system, and do not show the analyst what precise actions should be performed to carry out the instructions. Moreover, current SIEMS systems do not provide a user-friendly way for analysts to share action scripts for handling different types of security events or learn about a new capability that was recently added to the system. These problems hinder users from taking full advantage of the features offered by the system, which can result in inadequate handling of security events detected in the field.

SUMMARY OF EMBODIMENTS

Systems and methods described herein may be employed in various combinations and in embodiments to implement a security threat detection and response (STDR) system capable of recommending actions for handling security events detected in a computer network. In some embodiments, user actions taken via the graphical user interface of the system are recorded. The records are used as training data to train a machine learning model to recommend actions for different types of security events to subsequent users. The training may be performed online, so that the model continues to learn while it is used to make recommendations. In some embodiments, the model may infer a priority of an action based on observation data such as how quickly the action is taken in response to a security event, the order in which actions are taken, and the popularity of the action for the particular type of event. In some embodiments, the model may be configured to recommend actions that are newly introduced to the system or actions for new types of security events, so that analysts can quickly become aware of new system features without formal training.

BRIEF DESCRIPTION OF THE DRAWINGS

FIG. 3 illustrates various types of security event data and response action data that are used by the recommendation model, according to some embodiments.

FIG. 5A illustrates a graphical user interface (GUI) of the STDR system that presents security events and recommended actions to a security analyst, according to some embodiments.

FIG. 5B illustrates a GUI of the STDR system for executing steps in a recommended action script, according to some embodiments.

Figure 1:
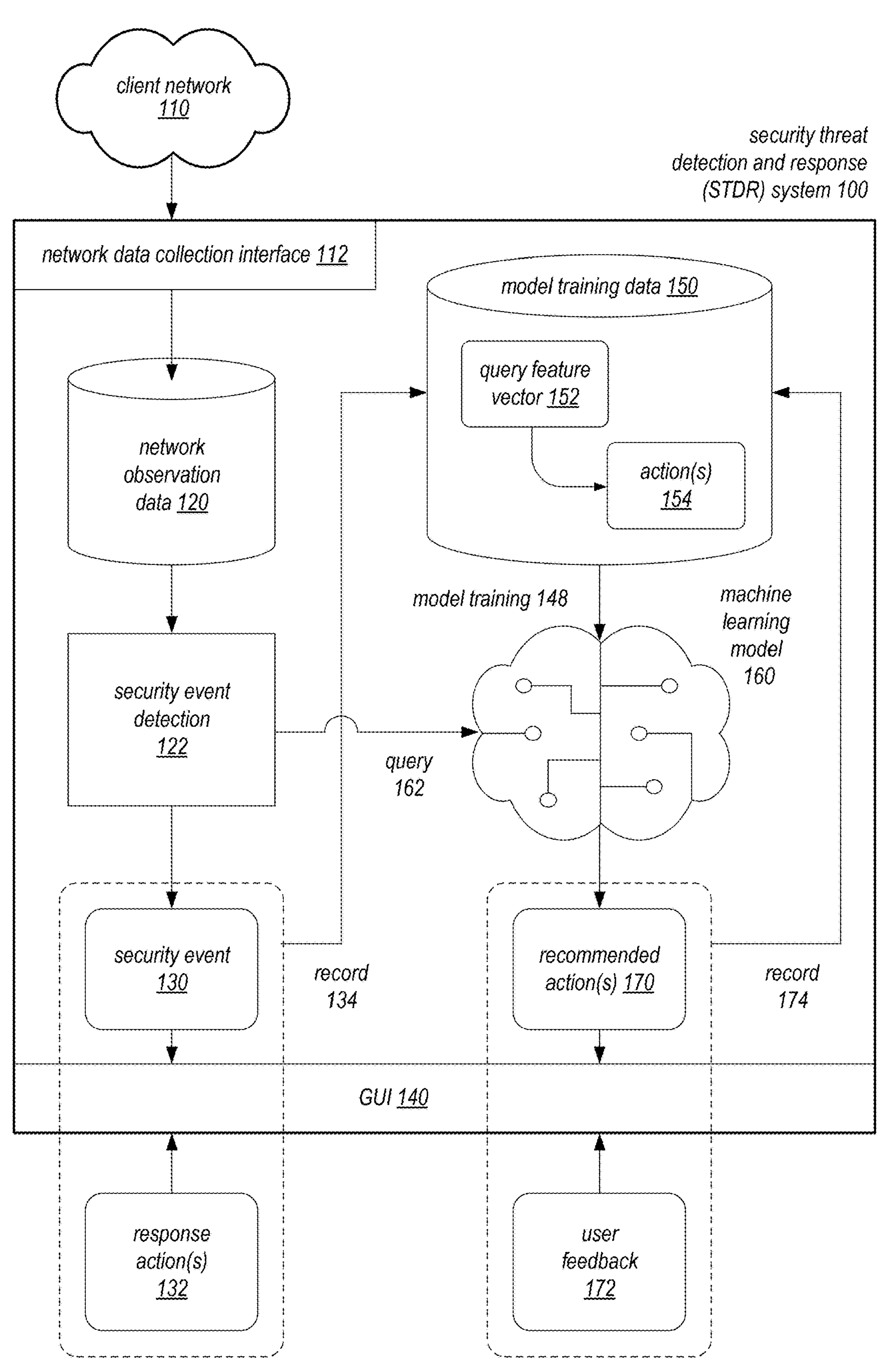
FIG. 1 is a block diagram illustrating a security threat detection and response (STDR) system that uses a machine learned (ML) model to recommend responsive actions for detected security events, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Security Information and Event Management (SIEM) systems are a type of security threat detection and response (STDR) system capable of detecting and managing security events in a computer network based on monitoring of network metadata. Embodiments of STDR systems may be used by a Managed Detection and Response (MDR) service provider to collect observation data from customer networks, monitor the collected data for security events from a centralized security operations center (SOC), and enable analysts at the SOC to perform investigative and remediation actions in response to detected events. A STDR system typically provides a graphical user interface (GUI) that presents security events to security analysts as alerts and allows the analysts to take action on the security events.

When an investigative or remediation action is possible within the STDR system, it may not be immediately apparent to the security analyst (e.g. a novice analyst) how the action can be performed via the system user interface. Even when the STDR system provides some high-level instructions on how a type of security event should be handled, these instructions do not translate to actual actions that can be executed via the system user interface. For example, there may be several specific steps that a user must take to investigate a security event, such as to query a set of logs collected from an asset, execute a job to retrieve additional configuration data from the asset, and run a specific scan on the asset metadata, etc. Not all security analysts will perform these tasks the same way, and some analysts may lack the knowledge to perform all of the steps.

Additionally, although the STDR system may provide user documentation about how to handle events, the documentation may go out of date so that it no longer reflects the most up-to-date best practices of the security team or the newest capabilities of the system. It can be time consuming and error prone to keep up such documentation over time as the system and cybersecurity landscape continuously changes. As a result, some security analysts develop their own workflows for handling security events and ignore the system-provided instructions entirely. These individually developed workflows do not always follow the best practices of the security team as a whole, and the best workflows are not systematically shared among members of the team.

To address these and other problems in the state of the art, this disclosure describes embodiments of an STDR system that programmatically recommends actions for handling security events based on previously recorded actions of security analysts. In some embodiments, analyst actions taken via the graphical user interface of the system are encoded as training data and used to periodically train a machine learning model to recommend actions to subsequent users for handling later instances of security events. In some embodiments, model training may be performed in an online manner, so that the model continues to learn while it is used to make recommendations. In some embodiments, the model may be trained based on user feedback data observed with respect to its recommendations, such as whether a recommended action is taken, or how quickly or often a recommended action is taken. In some embodiments, the model may be configured to recommend certain actions based on explicit user configuration, for example, to recommend a new capability of the system or actions for a new type of security event.

In some embodiments, the machine learning model used to make the recommendations may be a type of neural network, such as a self-organizing map (SOM). The model may be used to maintain a mapping that maps categories of security events to respective response actions, which may each be assigned a priority value. The priority value will reflect an importance or recommendation weight for a particular action, and may be changed over time based on observed analyst behaviors.

In some embodiments, the actions recommended by the model are recorded as sequences of actions directed at the graphical user interface (GUI) of the system, such as web page navigations, button clicks, API invocations, etc. These action sequences may be stored as executable actions scripts in an action library, which may be modified through both machine learning and direct user editing. When an action script is recommended by the model, it can be directly executed by the system without the user having to manually perform the individual steps.

In some embodiments, the recommendation model may make recommendations for actions that it has seen only once. For example, a user may record an instructional action sequence that uses a newly introduced capability of the system, and configure the model to begin recommending the script to other analysts. The new action script may be configured with an initial recommendation priority or rating, which can change based on feedback from other analysts.

In some embodiments, when an action is taken with respect to a security event, data about the event and the action is encoded as a feature vector. This vector may reflect various attributes such as the type of alert or security event, the difference in time between when the action was taken and when the alert fired, a generic type or category of the action taken, a generic category of resource that the action is taken against, more specific information about the resources (e.g. asset network addresses), and other action-specific metadata. In some embodiments, the feature vector may include multiple fields, and each field may be encoded as a numeric or binary value. For example, the type of alert or security event may be encoded as a numeric value that is unique to each type of alert or security event the system recognizes. The time difference may be encoded as a numerical value (e.g. in milliseconds) or a categorical value corresponding to distinct time ranges (e.g. within 10 seconds, within 5 minutes). The generic type of action taken may be encoded as a numeric value that is unique to each type of action that can be taken. The generic resource information may be encoded as a numeric value that is unique to each type of resource recognized by the system. The specific resource information may be encoded with a reversible hash from string to numeric value (e.g. base64), so that this field can be used to capture a variety of resource information without regard to the schema or structure of such information. Likewise, the metadata about the action may be encoded with as a reversible hash from string to numeric value to encode a variety of attributes of the action.

In terms of the metadata about an action, the recorded information may include, in some embodiments, the current URL for the application where the action was initiated from, the text that was clicked on within the application (e.g. a the label of a button clicked), any requests made to a backend service as a result of that action (e.g. a POST request to a URL with JSON data), any URL state changes within the application as a result of the action being taken (e.g. a navigation to a new page). Since the metadata will be used to provide interactive suggestions within the system, certain types of actions may be encoded with additional information. Examples of additional information may include CSS sectors or x-y coordinates on a web interfaces (e.g. a webpage) that was clicked by a user, user data that was entered into a form field, or DOM changes within a webpage (e.g. when the user expands a navigation tree). In some embodiments, any recordable changes in a web interface may be captured using action monitoring software or a browser action recording capability of the STDR system.

In some embodiments, the feature vector may be used to generate training data records for training the recommendation model. A training record may be divided into an "input" portion that is consumed by the model as input, and an "output" portion that represents desired output actions from the model. The input portion of the training record is used to query the model for action recommendations. In some embodiments, the input portion may indicate the type of alert or security event and other types of environmental data (e.g. the time of day) that may be relevant to the model's decision making process.

When the machine learning model generates output, the output may be unencoded to produce recommendations via the system GUI. In some embodiments, by changing the difference in time range part of the query (e.g. into the future or past), a sequence of actions may be suggested. In some embodiments, by decoding the metadata for each recommendation, the suggested actions may be interactively highlighted within the system GUI, so that the user can easily find user control widgets or data associated with the suggested action. In some embodiments, the map of actions and resources to their numeric values are stored in a library, so that a given numeric tuple of (generic action, generic resource, specific resource) can be reconstructed into human-readable text to be presented via the system GUI.

As will be appreciated by those skilled in the art, the disclosed features of the chart recommendation system provide numerous technical benefits to improve the functioning of computer systems of the state of the art (e.g. current STDR systems). The disclosed techniques are intended to be implemented as computer functionality, and not aimed at capturing non-patent eligible subject matter such as purely human methods, mathematical formulae, business methods, or human mental processes that can be performed without the use of computers. For example, the disclosed techniques use machine learning models to encode extensive mappings of observed analyst behavior with respect to different types of security events and enable the evolution of the mapping over time to reflect changes in analyst behaviors. The training and execution of these machine learning models are necessarily performed by computer systems, and the machine learning tasks involved cannot be practically replicated in the human mind. As another example, the captured data (e.g. security event data and action data) pertain to data generated by the computer system and are reduced to dense feature vectors, which enable the efficient storage and processing of this data by computers. As another example, the recorded actions recommended include executable actions that can only be executed by the computer system. As may be understood by those skilled in the art, the recommendations are not meant to be generated by humans, and the disclosed techniques are designed to benefit only computer systems. These and other features and benefits of the STDR system are described in further detail below, in connection with the figures.

FIG. 1 is a block diagram illustrating a security threat detection and response (STDR) system that uses a machine learned (ML) model to recommend responsive actions for detected security events, according to some embodiments.

As shown, the figure depicts a STDR system 100 that collects network data from a client network 110. The collected network data may be collected via a network data collection interface 112 of the system 100, and may include observation data such as network activity data, traffic data, process log data, asset configuration data (e.g. configuration changes), and user data (e.g. user behavior data) in the client network. In some embodiments, the STDR system 100 may be operated by a MDR service provider, which may execute the system 100 at a centralized geographical location (e.g. a SOC) to monitor many customer networks for security events.

As shown, the collected network data is stored in a network observation data repository 120. In some embodiments, the collected data may be stored as various types of activity logs that can be parsed and analyzed by other components of the STDR system 100. One such component is the security event detection component 122, which may be executed continuously or periodically to scan the collected network data for security events 130. In some embodiments, security events may be generated based on mechanical scans of the collected data 120 according to configured event detection rules, or in some cases machine learning models. For example, a security event 130 may be generated if a suspicious signature or traffic pattern is observed in a firewall log collected from the network 110.

Once a security event 130 is detected, it may be presented in the form of a visual alert via the graphical user interface 140 of the system 100, which may be monitored continuously by security analysts. The presented alert may indicate information such as the event category of the event, a severity level of the event, a machine or asset associated with the event (e.g. the IP address of the asset), a user associated with the event, a time associated with the event (e.g. when the event occurred), and a textual description associated with the event. In response to the alert, a security analyst may perform various response actions 132 via the GUI 140. The response actions 132 may include taking steps via the GUI to further investigate the event (e.g. examine the collected data 120 or logging on to the client network 110). The response actions 132 may also include remediation actions such as to quarantine affected assets, remove any detected malware, or configure heightened monitoring on the affected assets, etc.

As shown, these interactions over the system GUI 140 (the security event 130 and response actions 132) are recorded 134 and stored as training data in a model training data repository 150. In some embodiments, this recorded data 134 may be stored as training data records of fixed length. Each training data record may be a feature vector, which may include a query feature vector portion 152 that reflects inputs to the machine learning model 160 and an action portion 154 that reflects the analyst actions that will be used to train the machine learning model 160. In some embodiments, the actions portion 154 may be stored as an identifier or pointer that refers to a defined action sequence in an action library. The actions may be defined based on action categories (e.g. types of actions that can be executed by the STDR system 100). In some embodiments, a defined action may be composed of a sequence of several lower-level actions to create an action script. The actions may be stored in a reversible hash form so that they can be easily translated to human-readable text for recommendation purposes and/or automated execution. In some cases, some of the actions may not be executable actions (e.g. actions external to the STDR system 100), so that they are only recommended as instructions.

The model training data 150 is used to perform model training 148 on the machine learning model 160, which may be implemented as one or more neural networks, self-organizing maps, or other types of models (e.g. classification trees or clustering models). In some embodiments, the training and management of the model 160 may be performed external to the STDR system 100, for example, by a separate machine learning service. In some embodiments, the training may be performed in an online manner, so that the model continues to learn based on new observation data (e.g. new responsive actions 132) even as it is making recommendations 170 to analysts. An online learning approach allows the model 160 to continuously adapt to behavior changes of the analysts over time.

Once the model 160 is deemed sufficiently trained based on a configured performance criterion, it may be opened to receive queries 162 for action recommendations from other components of the STDR system 100. For example, the model 160 may begin to receive queries 162 for a certain type of security event detected by the security event detection component 122. The query 162 may be specified as a query feature vector 152, which is representation of the input data to the model, including the security event data. In response to the query 162, the model 160 will output data that can be readily translated into a set of recommended actions 170. As discussed, these recommended actions 170 may be presented with human-readable description, and optionally with user annotation to explain the purpose of the actions, etc. The recommended actions may also be directly executable via the GUI 140, so that the user does not have to manually perform the individual steps of an action sequence (e.g. clicking a button, typing in input into a form, etc.).

In some embodiments, after the system 100 presents the recommended actions 170 via the GUI 140, user feedback 172 regarding the recommendations are recorded. Such feedback may include how users interact with the recommended actions, such as whether the user performs the recommended actions, or how quickly the user performs the recommended actions, etc. In some embodiments, the feedback may indicate an explicit comment or rating from the user regarding a recommended action, such as "highly recommended," "yes this action resolved the security event" or "the recommended action was not useful."

As shown, in some embodiments, the recommended actions 170 and user feedback 172 are recorded 174 as training data 150 to further train the machine learning model. In some embodiments, the user feedback information may be added to the model input or output portion of a training record, so that the model can take such information into account during the machine learning process to improve its recommendations for the future.

In the above manner, the STDR system 100 is able to provide highly targeted and system-specific action recommendations for security analysts based on previous actions of the analysts. The machine learning model is able to learn, through the machine learning process, to distinguish different types of security alert scenarios and determine which courses of actions should be followed. Moreover, because the model is trained in an online manner and continuously improved via user feedback, it will gradually improve over time to learn the best flows for different types of security events and codify this knowledge at the institutional level.

Figure 2:
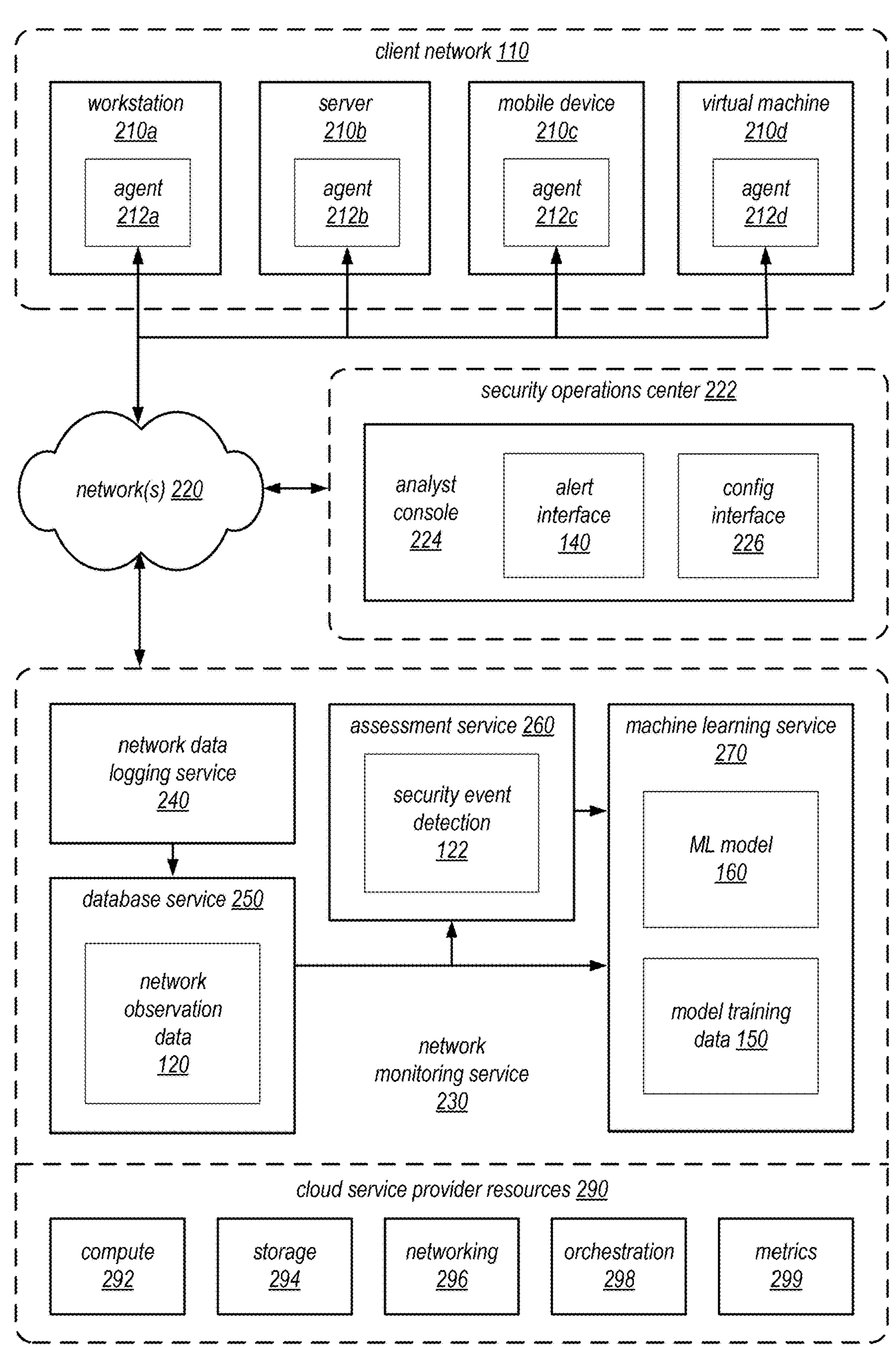
FIG. 2 illustrates an example network monitoring service and analyst console that employs a ML model for recommending responsive actions for detected security events, according to some embodiments.

FIG. 2 illustrates an example network monitoring service 230 and analyst console that employs a ML model 160 for recommending responsive actions for detected security events, according to some embodiments.

As shown in the figure, a network monitoring service 230 is configured to monitor the client network 110 over one or more networks 220. The network monitoring service 230 implements the components of the STDR system 100 of FIG. 1. The client network 110 may be one or many client networks monitored by the network monitoring service 230, which may include private networks (including cloud-hosted virtual private networks) operated by different groups, organizations, companies, or other types of entities that are customers of the network monitoring service 230.

In some embodiments, the network monitoring service 230 may be operated as part of a MDR service, and the monitoring may be implemented as part of a SIEM system. In some embodiments, the network monitoring service 230 enables monitoring of the client network 110 by security analysts working from a security operations center 222, which may be at a different geographical location than the client network 110. Security analysts at the security operations center 222 may work from analyst workstations or consoles 224 that implement an alert interface 140 and a configuration interface 226. The alert interface 140 may be configured to present security events 130 detected in the client network 110 to the security analyst. The alert interface 140 may be implemented as part of the GUI 140 of FIG. 1, which can present model-generated action recommendations 170 to the security analyst and allow the analyst to perform response actions 132 and provide user feedback 172. In some embodiments, the configuration interface 226 allows the security analysts to modify configuration settings of the network monitoring service, including configuration settings pertaining to the recommendation model 160.

In various embodiments, the network(s) 220 may encompass any suitable combination of networking hardware and protocols necessary to establish communications between the client networks 110 and the network monitoring service 230. In some embodiments, the machines 210*a-d* may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, firewall/security software, etc.) for establishing networking links between the client networks 110 and the network monitoring service 230. As shown, agents 212*a-d* may be deployed on the machines 210 to aid the operations of the network monitoring service 230, for example, to collect observation data from the client network 110 or carry out configuration change actions on the machines 210.

As shown, the client networks 210 can include different types of computing resources, such as a workstation 210*a*, a server 210*b*, a mobile device 210*c*, and a virtual machine 210*d*. Each of these types of machines may be a machine monitored by the network monitoring service 230. The virtual machine 210*d* may be an instance of a compute resource that is emulated and hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER and KUBERNETES. As may be appreciated, the machines 210 may include a variety of other types of computing systems, including embedded systems, networking devices, storage devices, Internet-of-Things (IoT) devices, vehicles, and the like.

As shown, the network monitoring service 230 may include a number of independently executing services, which are implemented on the resources 290 provided by the cloud service provider. For example, a network data logging service 240 may be used to implement the network data collection interface 112, to receive collected data from the client networks 110 and persist this data in the network observation data repository 120. A database service 250 may be used to store the network observation data 120.

As shown, the security event detection functionality 122 may be implemented by an assessment service 260. The assessment service 260 may be configured to perform a variety of assessments of the client network based on the network observation data 120, and generate different types of security events 130 to the analyst console 224. The assessments may involve looking for signs of a cyberattack or malware, vulnerabilities to attacks, conditions that represent a type of threat, misconfigurations in the client network, suspicious or inappropriate user behavior in the client network, suspicious network or machine activities, network policy violations, and various other types of event signals. Security events may be raised in response to conditions such as the detection of malware signatures, missing application patches, suspicious network traffic patterns, suspicious emails, among other things. The assessment service 260 may monitor for and these conditions continuously over time and report security events or provide more detailed assessment reports. In some embodiments, output of the assessment service 260 may be written to the network observation data repository 120 as an additional layer of data.

As shown, the ML model 160 and model training data 150 may be maintained in a machine learning service 270, in this example. In some embodiments, the machine learning service 270 may be a service that offers a variety of tools to implement machine learning applications, such as different types of ML models and model training algorithms, model data curation and feature engineering, model deployment, model performance tracking and execution management, model result interpretation, and the like. In some embodiments, the machine learning service 270 can support online model training or an active learning process, where the ML model 160 continuously learns from new observation data over time. In an online learning process, the ML model 160 will continue to learn while generating production output (e.g. action recommendation to analysts). In an active learning process, the output of the ML model 160 may be judged repeatedly by human evaluators (e.g. in the form of user feedback 172), which will be used to perform further training on the model.

As shown, the network monitoring service 230 may be implemented in a cloud service provider environment using infrastructure or resources 290 provided by the cloud service provider. In some embodiments, the network monitoring service 230 may be configured as one or more web services that receives web services requests formatted as JSON documents. The network monitoring service 230 may support REST-style or document-based (e.g., SOAP-based) types of web services requests. The network monitoring service 230 may implement service interfaces using other types of remote procedure calling protocols, such as GOOGLE PROTOCOL BUFFERS or PROTOBUF. The cloud service provider network may provide hardware and/or software to implement service endpoints so that a request directed to that endpoint is properly received and processed.

As shown, the cloud service provider resources 290 may include different types of computing resources 292 (e.g. virtual machine instances or container instances), which can be leased by service customers to implement custom hosted services. As shown, the cloud service provider may provide resource services to host resources for its tenants, such as compute resource services 292, storage services 294, networking services 296, orchestration services 298, and resource metrics services 299. The services of the network monitoring service 230 may be built using these underlying resource services provided by the cloud service provider. In some embodiments, the cloud service provider resources 290 may implement features such as load balancing of incoming service requests and/or dynamic management and scaling of resource pools. In some embodiments, the cloud service provider may be a provider such as AMAZON WEB SERVICES or MICROSOFT AZURE.

FIG. 3 illustrates various types of security event data and response action data that are used by the recommendation model 160, according to some embodiments.

As shown in this example, the observation data 310 for the ML model 160, which may be used as training data 340 to train the model, is divided into action input data 320 and action output data 330. When the model 160 is run, it will receive the action input data 320 as an input feature vector, and then generate an output that indicates the attributes of action output data 330, possibly as an output feature vector. In some embodiments, the output feature vector may be encoded so that it can be programmatically translated back to a human-readable and system-executable form to be presented as an action recommendation. In some embodiments, the action output 330 may simply indicate an action ID, which can be used to retrieve an action stored in an action library 350. When the model 160 is trained, a training record 340 may include both the action input 320 and the action output 330, and the model's behavior parameters will be tuned during the training process so that the model is able to predict the training output 330 based on the training input 320. Thus, the model 160 is trained over time to mimic analyst actions for different categories of security events, and provide these actions as recommendations.

As shown, the action input data 320 may include various attributes of the security event that was issued by the system. These input data 320 may indicate a security event ID (which may be uniquely assigned by the STDR system), one or more event categories, a security level of the event, the affected asset(s) and asset categories of the assets, the identity and properties of the client network that the asset is located in, the application(s) and/or data stored on the asset (including configuration data), the user(s) or user activities associated with the event, the time when the security event was generated (or when the underlying event condition occurred), one or more potential threats that are associated with the event (such as CVE numbers of known attacks or vulnerabilities), and various textual descriptions associated with the event. These attributes may be encoded into a fixed-length feature vector using various techniques, such as configured mapping, hashing, categorization or binning, normalization, and/or natural language encoding techniques such as TD-IDF and/or n-grams. In some embodiments, the input feature vector may include multiple fields that are encoded in different ways.

Additionally, in this example, the action input 320 also includes data about previous investigation findings about a security event, which reflects the investigative state for a continuing investigation of the security event. For example, when an analyst investigates a security event, he or she may find intermediate information during the investigation process, which may inform later investigative steps. These earlier investigative findings, such as log search findings, asset configuration check results, or previous remediation actions taken, may also be encoded as part of the input feature vector. In some embodiments, these previous findings may simply fill in initially missing fields of the initial security event. In some embodiments, the previous findings data may be encoded as additional field(s) of the feature vector, for example, to include a human-written description of a finding.

As shown, the action output data 330 may indicate various attributes of action(s) that were taken by a security analyst in response to a security event. The output data 330 may indicate a unique action ID (which may be used as an index into the action library 350), one or more action categories of an action, the resources used or acted upon and associated resource categories, the particular actor (e.g. the security analyst) who took the action and attributes of the actor (e.g. experience level), timing data associated with action (such as how quickly an action was taken and the relative order the action was taken in a list of several possible actions), and other action-specific metadata (e.g. the URL of the webpage used to initiate the action, any user controls used to initiate the action, the web request or API request generated as a result of the action, state changes within a webpage caused by the action such as DOM structure changes, or in some cases movement of the user pointer device). These types of action may be recorded by browser activity recorders or generalized recorders for computer session activity.

In some embodiments, the action library 350 may store different types of actions 350 that can be recommended by the recommendation model 160. These actions may include GUI actions 352 (e.g. actions directed to the system GUI), API actions 354 (e.g. actions that invoke a particular API of the STDR system), and external actions 356, which may be actions that are performed outside of the STDR system. Examples of external actions 356 may include GUI or API actions to another type of software, native commands run on an operating system shell, actions on another computer device. Some actions may be stored in a defined structure according to a schema (e.g. a JSON definition), and may include runtime parameters that can be specified at the time of execution (e.g. a specific machine IP address). In some embodiments, not all actions stored in the action library 350 are directly executable; some of the actions may be recommended as instructions only. As shown, some actions stored in the library 350 may be standard actions 357 defined for the STDR system (e.g. actions that correspond to a GUI element or API call), while other actions may be custom actions 358 added later by the user or through analyst observations. For example, some of the actions may be action scripts 359 that aggregate a sequence of primitive actions to perform a specific flow of GUI actions, for example: navigating to a webpage associated with a machine or user indicated in the event, copying or pasting a piece of information from or to the web-based interface, navigating to a webpage for performing a type of log search associated with the machine or user, composing a query using information copied from the web-based interface, clicking a button to run the query, composing a textual report of the investigation of the security event (e.g. based on the query results), and creating a ticket to initiate a remedial action on the machine or user.

Additionally, in this example, the action output 330 also includes any action recommendation feedback by the user, for cases where an action output was taken in response to one or more model-recommended action(s). Depending on the embodiment, action recommendation feedback may be encoded as part of the action input data 320 for model training purposes. In some embodiments, the action recommendation feedback may be used as a type of training metadata (e.g. converted to training hyperparameter(s)) to control how the observed action output is used during the training process (e.g. how heavily an observation record should be weighed). As shown, the recommendation feedback may indicate information such as whether a recommended action was taken or not taken (and the model recommended priority of the action taken), action statistics over a history of action recommendations, and explicit user ratings about a recommended action such as a rating score or a textual explanation.

As shown, the observation data 310 may then be transformed (i.e. encoded) into training data, where each training record 340 captures a sequence of one or more response action taken in response to a security event or investigative step of the security event. These training records 340 may be captured automatically and stored in a training data repository 150 to be used for later model training 360. In some embodiments, the system may be configured to randomly sample analyst sessions for recording, so that only a selected percentage of analyst sessions are recorded. In some embodiments, the system may augment the training data by generating synthetic training records based on actual observation data (e.g. to vary attributes such as the username or machine IP address).

Additionally, in some embodiments, some training records 342 may be created through user specification and not through recorded observation data 310. For example, the system may allow users to explicitly define a sequence of response actions for a particular security event. This approach may be used to introduce a new action sequence into the recommendation model, for example, to use a new system capability or respond to a new type of security event. These user-defined action sequences may then be evolved in the recommendation model 160 through actual observations of analyst behavior and feedback. The training data in the training data repository 150 may then be used by a model trainer to train the machine learning model 160, for example in an online training process 360.

The bottom portion of FIG. 3 shows a runtime operation loop of the STDR system, where the recommendation model 160 is used repeatedly to generate successive steps in an investigative process. As shown, an input feature vector 370 of an initial security event is first used to query the model to obtain an initial set of recommended actions and action priorities 380. The recommended set of actions 380 is displayed to the user as possible courses of action. The results of the actions taken by the user and any user feedback 390 are then recorded. In some embodiments, a custom action may ask the user to supply his or her opinion (e.g. via a GUI form) based on previous investigative information, and the user opinion may be recorded as the action result. The result data may be used to generate additional training data 340. Moreover, the result data may be used to generate a new input feature vector 370 to query the recommendation model 160 again. In this manner, the investigative process can proceed by repeatedly querying the model with additional investigative result data to obtain more and more investigation action options.

Figure 4A:
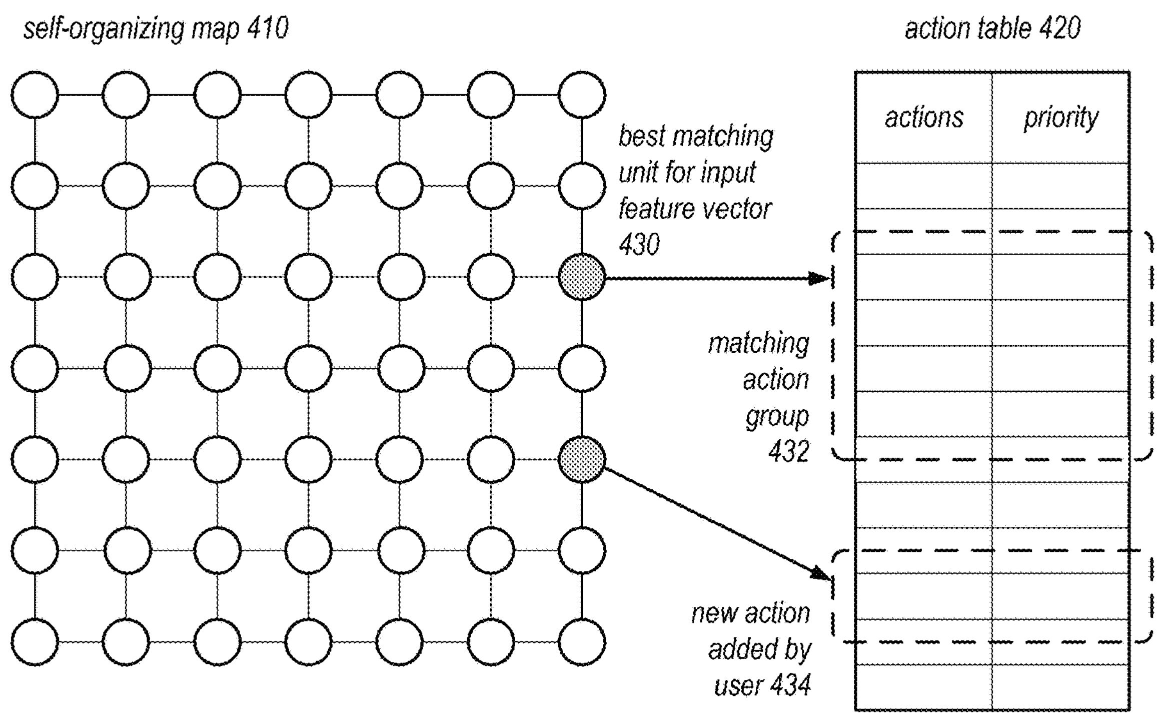
FIG. 4A illustrates a self-organizing map (SOM) that can be used to implement the recommendation model, according to some embodiments.

FIG. 4A illustrates a self-organizing map (SOM) that can be used to implement the recommendation model 160, according to some embodiments.

In a SOM model, a neural network is trained using a machine learning process (e.g. an unsupervised ML process) to create an n-dimensional representation of a set of training samples (here the response actions of analysts). The neural network may be organized in a regular grid where each neuron or unit is connected to an equal number (e.g. four or six) of neighboring neurons on units. In some embodiments, a toroidal grid may be used where units on opposite edges of the grid are connected, so that no edges exist in the network. Each unit in the neural network is associated with a weight vector that will be tuned during model training.

When the SOM model is trained, a large number of input feature vectors are used to adjust the weight vectors of the model units. For each input feature vector, a best matching unit (BMU) in the neural network is determined based on the similarity metric (e.g. Euclidean distance) computed between the feature vector and the weight vectors of the units. Then, the weights of the BMU and a set of units near the BMU are adjusted towards the input feature vector. The amount of the adjustment decreases as grid distance increases from the BMU. Thus, each input feature vector during training will distort the shape of the network in the feature vector space, but preserve the topological relationship of the units based on the grid. After many training samples, the weight vectors of the units in the SOM will be grouped around clusters of input feature vectors that are similar. Thus, the units of the neural network will "self-organize" into groups, so that the network devotes more units to encode areas where many similar observation samples are clustered, and devotes fewer units to parts of the search space where few or no observations samples are located.

As shown in the FIG. 4A, in this context, the self-organizing map 410 organizes actions by assigning an action group to each unit or neuron in the SOM 410, which represents a particular input (e.g. a feature vector or an action input 320). The unit-to-group mapping may be stored as an action table 420, which may be a hash table keyed based on the unit IDs of the SOM units. When multiple observed action feature vectors are assigned to the same SOM unit during training, they are placed in the same action group. As shown, the action table 420 may also maintain a priority value for each action, which can be used to rank the actions in an action group at recommendation time. The priority value may be determined based on the input feature vector attributes such as the observed action timing data discussed in FIG. 3, observed frequency of an action, recommendation feedback data, or configured training parameters.

When the SOM 410 is queried, the input feature vector is used to identify a best matching unit 430 in the SOM. The BMU is then used to look up corresponding actions in the action table 420 for recommendation. As discussed, in some embodiments, new actions 434 may be added to the recommendation model manually. The addition may be performed via model training (e.g. using synthetic training records 342) or directly adding the new action 434 into the action table 420 and associating the new action with a selected SOM unit.

It is noted that the self-organizing map is only one example type of machine learned model that can be used as the recommendation model 160. Depending on the embodiment, other types of machine learned models may also be used. For example, in some embodiments, a different type of neural network may be trained to create a different type of action search structure. As another example, a clustering model such as a K-means model may be used to cluster the input feature vectors. As another example, the input feature vector may be used to generate a forest of decision trees, which may be trained to lead to the best course of action encoded by a leaf node.

Figure 4B:
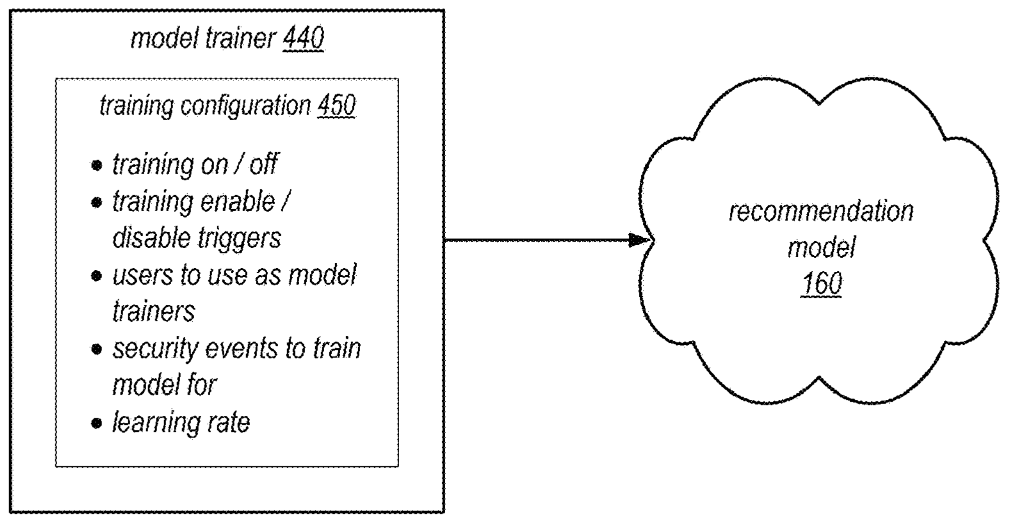
FIG. 4B illustrates a model trainer component for the recommendation model and various types of training configuration parameters, according to some embodiments.

FIG. 4B illustrates a model trainer component for the recommendation model 160 and various types of training configuration parameters 450, according to some embodiments. The training configuration parameters 450 may be submitted to the system via a configuration interface such as configuration 226 of FIG. 2.

As shown, the training configuration 450 may be used to control the operations of a model training 440, such as when model training is turned on and off. For example, in some embodiments, analyst actions may be randomly sampled to be recorded as training data, and the sampling rate may be configurable. In some embodiments, model training or training data recording may be enabled or disabled programmatically based on configured triggers. For example, the system may be configured to only record the actions of certain users (e.g. expert users). As another example, the system may be configured to train the model only for certain types of security events, so that the recommendation model will not change its recommendation behavior for other types of security events. In some embodiments, the configuration parameters may control a learning rate of the model 160, so that newly observed user actions have more or less training impact on the behavior of the model. In some embodiments, the STDR system may employ multiple recommendation models 160 for different purposes, and the training configuration parameters 450 may be separately configured for each model instance.

Figure 4C:
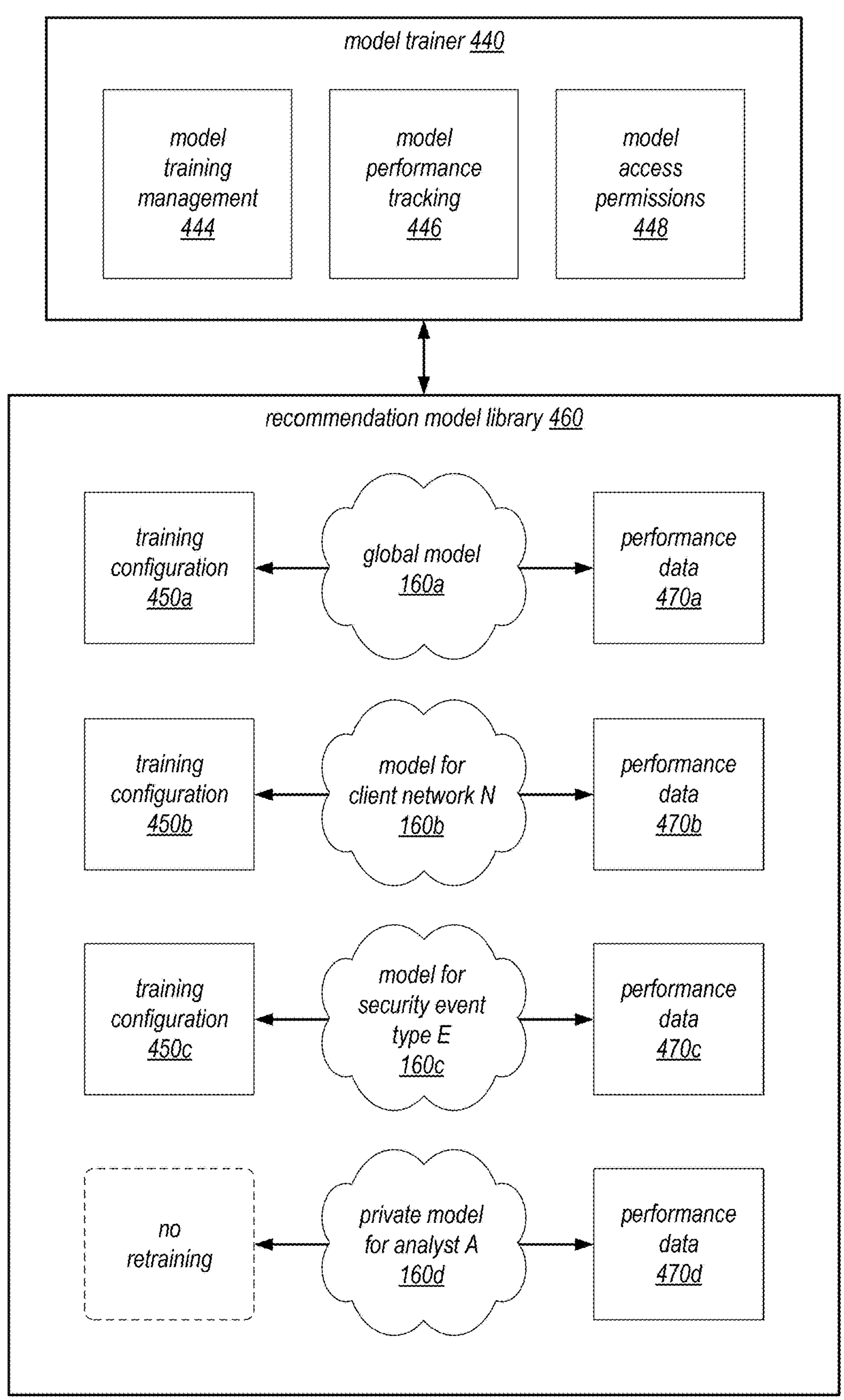
FIG. 4C illustrates a recommendation model library that stores various types of recommendation models maintained by the system, according to some embodiments.

FIG. 4C illustrates a recommendation model library 460 that stores various types of recommendation models maintained by the system, according to some embodiments.

As shown, in this example, the model trainer 440 is configured to perform several functionalities, including model training management 444, model performance tracking 446, and model access permission control 448. The model training management component 444 may be responsible for interacting with model training processes (e.g. training processes provided by a machine learning service) to control the schedule and parameters of how the models 160*a-d* are trained.

In some embodiments, model training may be initiated based on observed model performance data 470*a-d* of each model instance 160*a-d*, which may be stored in the recommendation model library 460 for each model instance. A model's performance may reflect the quality of its recommendations, as measured by factors such as how often the recommendations are accepted, how quickly the recommendations are taken, and other forms of user feedback. As another example, model performance may be measured by how often a recommended course of action was able to successfully resolve a security event. In some embodiments, what type of model performance metrics 470 are tracked may be controlled via model configuration data 450, and this configuration data 450 is stored in the model library 460 and used by model trainer components 444 and 446 to carry out their functions. In some embodiments, a stored model 160*d* may be configured so that it is not retrained.

As shown, the model instances 160*a-d* stored in the model library 460 may have different access permission and usage scopes, which may be enforced by the model access permissions component 448. The access permissions may also be stored as model metadata in the model library 460. As shown in this example, the global model 160*a* may be accessible to all users of the STDR system and is trainable by the actions of all users. Model 160*b* is a model instance for a particular client network N, so that it will only recommend actions for security events that are generated for that client network, and only response actions performed for that client network will be used to train the model. Model 160*c* is a special model instance for just a particular type of security event E (e.g. a specific type of security threat associated with a complicated or evolving response flow). Thus, model 160*c* will only be used to make recommendations for security event E and only be trained based on response actions taken for security event E. Finally, model 160*d* is a private model maintained by a particular analysts A, who may wish to maintain the private model for his or her own use, and not allow the system to change the model's behavior automatically.

FIG. 5A illustrates a graphical user interface (GUI) 500 of the STDR system 100 that presents security events and recommended actions to a security analyst, according to some embodiments. The security alert review interface 500 shown in the figure is an example of the alert interface or GUI 140 of FIGS. 1 and 2.

In some embodiments, GUI 500 may be a web-based GUI that is displayed in a web browser as part of a web application. The contents of the GUI 500 may be HTML elements or browser-executable code (e.g. JavaScript) elements, which may be used to implement different user control elements (e.g. buttons and forms) on the GUI. The GUI elements on the web-based GUI may be organized in an object hierarchy according to a Document Object Model (DOM) tree, which may be dynamically changed through user interactions with the GUI. In some embodiments, user actions taken on the GUI may generate network or service requests, including HTTP requests or web services requests encoded in a JSON format to read or update web-based resources.

In this example, the top of the GUI 500 shows a detected security event 510, which is a type of suspicious user behavior identified in a monitored network. The GUI 500 displays some details about the security event, which may be encoded in an input feature vector for the recommendation model 160. The GUI 500 also allows the security analyst to take a number of response actions using the buttons shown on the right-hand side. As discussed, these actions may be recorded by the system as training data for the recommendation model 160.

As shown, the bottom portion 520 of the GUI 500 provides a number of recommended actions generated by the recommendation model 160, based on the security event. In this example, a list of four action scripts 522 are recommended, each with an associated priority value 524 indicating a respective recommendation weight. The recommendation portion 520 allows the security analyst to immediately run a recommended action via web links in column 526, so that the analyst does not have to manually follow a list of instructions. As discussed, how the analyst interacts with this list of recommended actions may be recorded as recommendation feedback to be used to perform further training of the model. As shown in this example, the security analyst may also provide explicit feedback via the "provide feedback" button, which may allow the user to specify a user rating or provide descriptive details about why a recommendation was or was not useful.

FIG. 5B illustrates a GUI 530 of the STDR system 100 for executing steps in a recommended action script, according to some embodiments.

In this example, the security analyst has elected to run a recommended action script shown in GUI 500, which is to perform a query 532 on the connection logs associated with the affected asset. The specific steps of the recommended action script 550 are shown on the right of the GUI, which includes looking up and copying a hostname or network address of the network asset, looking up and copying an external address associated with the security event, and performing a connection log query using the two copied values. These steps may be performed automatically when the analyst selects the action script, or individually via a "run now" button or other user control. For example, the action steps view 550 may be displayed as a separate pane or section in the GUI, so that the users can step through the script to navigate to different webpages and perform different actions via the GUI. As shown, the action script has already been partially performed to execute a log query on the affected asset, and the results of the query are shown in the "query results" section 540 of the GUI.

As shown, in this example, the action script asks the user to perform a step to examine a particular attribute in the query results and provide feedback as an investigation finding. As discussed, in some embodiments, the system allows users to define these types of custom actions to solicit these types of investigation results, which will be added to an input feature vector to query the recommendation model for a next set of recommended actions 560.

As shown, in this example, the system has automatically highlighted 542 the log attribute that is indicated by the action step, to make it easier for the analyst to perform the step. Such highlighting 542 may be used to find specific instances of a text in the GUI, highlight a specific area on the GUI, or enable a particular user control element (e.g. a button or field).

Figure 6:
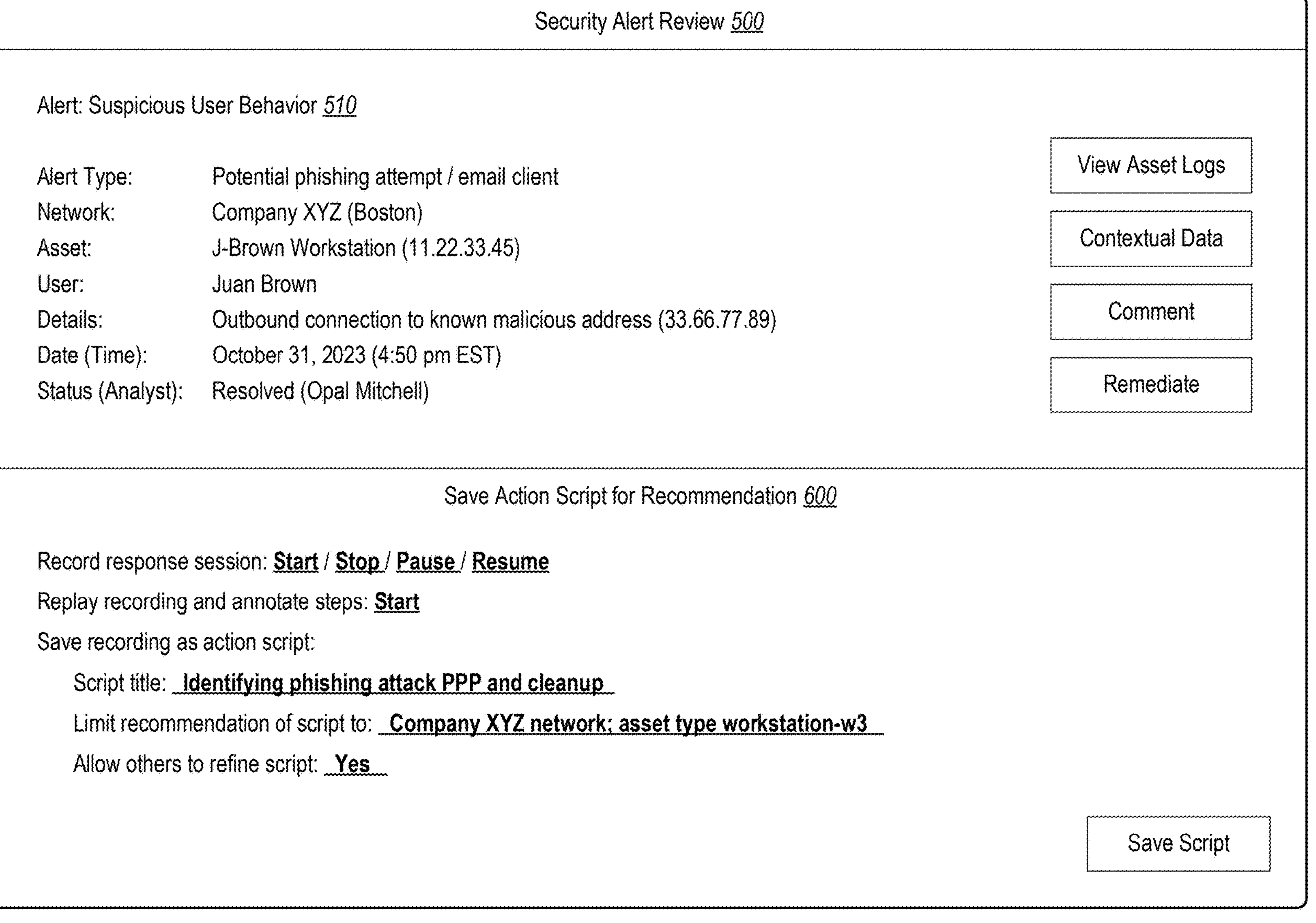
FIG. 6 illustrates a GUI of the STDR system that allows a user to configure the recording and saving of action scripts for recommendation, according to some embodiments.

FIG. 6 illustrates a GUI of the STDR system that allows a user to configure the recording and saving of action scripts for recommendation, according to some embodiments.

As shown in this example, the GUI 500 of the system provides a section 600 that allows the analyst to configure various aspects of recording a user session and saving the user session as a recommendable action script. As shown, section 600 provides user controls to start, stop, pause, and resume the recording of a user session. Moreover, section 600 allows the user to replay the recording and annotate steps in the recorded session. In some embodiments, the replay may be a replay of the generated action script, in the same way that a later analyst may execute the action script through a recommendation. In some embodiments, the replay process may replay a recorded video of the user session.

During the replay, the action script creator may annotate steps within the action script using natural language descriptions. As discussed, in some embodiments, the system will automatically generate a natural language description and/or name for each step in the observed action sequence based on attributes of the input feature vector. However, the user may add to this description by manually adding further comments. In some embodiments, these added annotations may be saved as action metadata in the action library 350. In some embodiments, the annotations may also be encoded in the training records used to train the recommendation model 160.

Once the action script has been edited and annotated to the script creator's satisfaction, it can be saved to the action library 350. In this example, GUI section 600 allows the creator to save the action by specifying a script title and certain control information regarding the script including the usage scope and whether to allow further modifications of the script. In this manner, saved scripts are published to a wider group of security analysts through recommendations, and refined over time to promote the best set of response flows for commonly observed security events.

Figure 7:
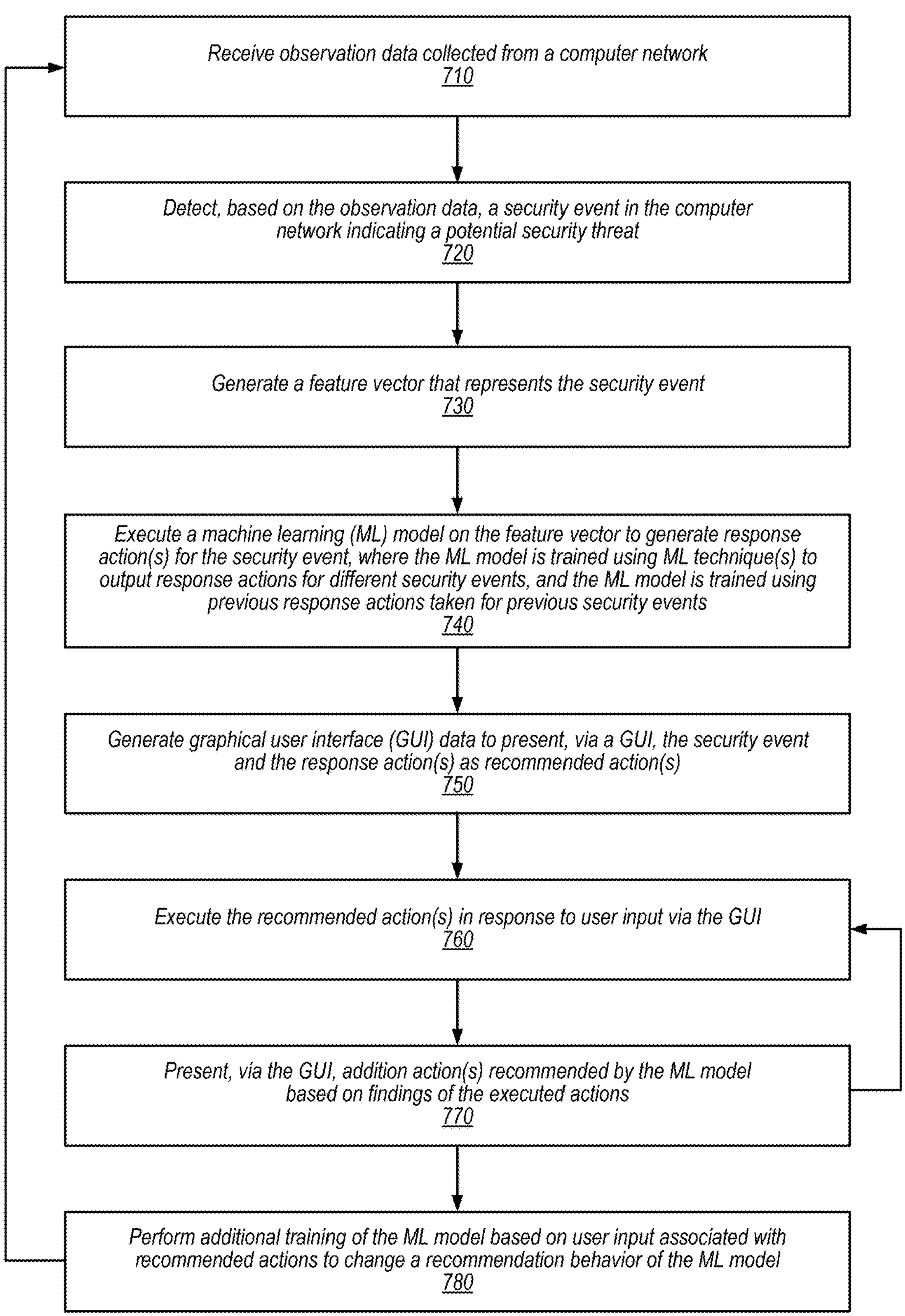
FIG. 7 is a flowchart illustrating a process of the STDR system using the recommendation model to recommend response action(s) to a security event, according to some embodiments.

FIG. 7 is a flowchart illustrating a process of the STDR system 100 using the recommendation model 160 to recommend response action(s) to a security event, according to some embodiments.

The process begins at operation 710, where observation data collected from a computer network (e.g. client network 110) is received by the STDR system. In some embodiments, the STDR system may be a SIEM system and/or used by a MDR service provider to monitor many client networks for security threats. The observation data may include user or machine activity data, network traffic data, process log data, asset configuration data, and user profile or behavior data observed in the client network, among other types of data. The STDR system may implement analyst stations at a SOC that provides GUIs to allow analysts to view and investigate the collected data and take responsive actions to mitigate the security threats.

At operation 720, the STDR system detects, based on the observation data, a security event in the computer network that indicates a potential security threat. For example, the detection may be performed by one or more assessment services 260 that periodically examines the collected data for configured conditions, such as suspicious user activities or traffic patterns, malware signatures, inappropriate configuration settings, etc. A detected security event (e.g. security event 130) may be reported as an alert via the system GUI (e.g. GUI 500).

At operation 730, the system generates a feature vector that represents the security event. This feature vector, which may be the query feature vector 152 of FIG. 1, may encode a variety of information needed to query the recommendation model 160, including attributes of the action input data 320 discussed in connection with FIG. 3. The feature vector may be a fixed-length data string of multiple fields, where the fields are used to encode different types of input data used by the recommendation model. As discussed, in some embodiments, the input feature vector may include information about investigation findings or results obtained through previous actions taken against the security event in the investigative process.

At operation 740, the system executes a machine learning (ML) model (e.g. recommendation model 160) on the feature vector to generate response action(s) for the security event, where the ML model is trained using ML technique(s) to output response actions for different security events, and the ML model is trained (e.g. by a model trainer 440) using previous response actions taken for previous security events. As discussed, in some embodiments, the recommendation model may be a neural network or a SOM (e.g. SOM 410). In some embodiments, the execution and training of the model may be carried out by a machine learning service 270, which may be an external service to the STDR system and/or provided by a third party provider (e.g. a cloud-based infrastructure service provider).

At operation 750, the system generates graphical user interface (GUI) data to present, via a GUI (e.g. GUI 500), the security event and the response action(s) as recommended action(s). In some embodiments, the GUI is a web-based interface that is displayed at an analyst station, for example, via a web browser or a web application. In some embodiments, the GUI also provides a priority value for each recommended action that reflects the model's recommendation weight for the recommended action. The GUI may also allow the analyst to directly execute the recommended actions via the STDR system, as shown in FIGS. 5A and 5B and indicated in operation 760.

At operation 770, the system presents, via the GUI, additional action(s) recommended by the ML model based on findings of the executed actions. As discussed, some embodiments of the system allow the analyst to investigate the security event in stages, where each stage gathers additional findings about the event, and the gathered information is used to select recommended actions for a next stage. The additional findings and results obtained at a particular stage may be encoded as a new input feature vector to query the recommendation model for recommended actions for the next stage. As shown, these stages may be performed repeatedly until ultimately the investigation is completed and/or when a remediation action is selected. It is noted that in some cases, the entire investigation process may span over a long period, potentially over several days.

Finally, at operation 780, the system performs additional training of the ML model 160 based on user input associated (e.g. user feedback 172) with recommended actions to change a recommendation behavior of the ML model. As discussed, in some embodiments, the action recommendation feedback may be used as part of the training data to train the recommendation model 160, so that the model will gradually learn to generate recommendations that will better conform to the user feedback. Thus, the recommendation model is not only learning new response flows from initial observations of the actions of one analyst, but also continuously refining its recommendations over time based on the opinions of the analyst community as a whole.

Figure 8:
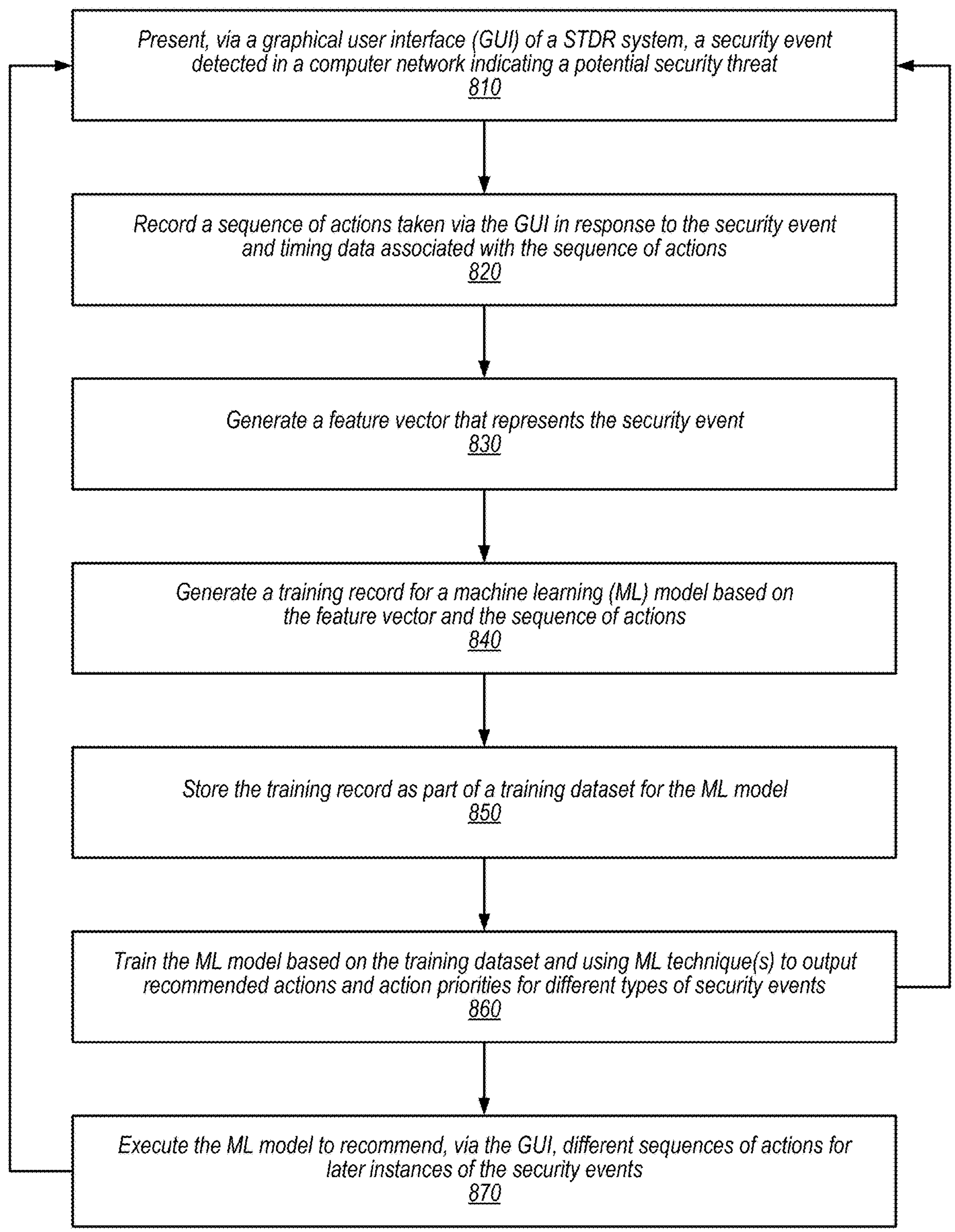
FIG. 8 is a flowchart illustrating a process of the STDR system recording an action script for responding to a security event and using the recording to train the recommendation model, according to some embodiments.

FIG. 8 is a flowchart illustrating a process of the STDR system 100 recording an action script for responding to a security event and using the recording to train the recommendation model, according to some embodiments.

At operation 810, the system presents, via a graphical user interface (GUI), a security event detected in a computer network indicating a potential security threat. The GUI may be, for example, GUI 500 as shown in FIGS. 5A and 6, and may be implemented as a web-based interface generated by a web server (e.g. as HTML data) and displayed via a web browser or web application.

At operation 820, a sequence of actions taken via the GUI in response to the security event (e.g. response actions 132 by a security analyst) is recorded. The actions may be recorded using web interaction monitoring tools or capabilities implemented within the web application. In some embodiments, the recorded actions may be stored in a log form and accessible via an API. The recording may be replayed to programmatically repeat the sequence of actions. In some embodiments, timing data associated with the sequence of actions is also recorded. The timing data may indicate, inter alia, a timestamp of when an action was performed, an elapsed period after a checkpoint in a recorded session, or a relative ordering of when certain actions were taken. The action sequence will be used as training data to train the recommendation model 160 to learn analyst actions taken against the type of security event, and the timing data may be used to generate a priority or recommendation strength of the action sequence.

At operation 830, the system generates a feature vector that represents the security event (e.g. query feature vector 152 or a feature vector encoding the action input data 320 shown on FIG. 3). This feature vector may be used as an input feature vector for the recommendation model 160. The feature vector may be a fixed length vector that encodes many data fields used by the recommendation model.

At operation 840, the system generates a training record for the recommendation model 160 based on the input feature vector and the sequence of actions. In some embodiments, the sequence of actions may be used to generate an output feature vector, which may encode the action output data 330 shown in FIG. 3. In some embodiments, the output action data may simply be stored in an action library (e.g.

action library 350) and the output vector may simply comprise a pointer to the action sequence (e.g. a unique action ID) used by the action library. The input feature vector and the output feature vector may then be combined into a training record (e.g. training record 340) that can be used to train the recommendation model. In some embodiments, the training record may be stored as part of a training dataset as indicated in operation 850, in a repository such as the training data repository 150 of FIGS. 1 and 3.

At operation 860, the recommendation model 160 is trained based on the training dataset using one or more machine learning techniques, to learn to output recommended actions and action priorities for different types of security events. As discussed, in some embodiments, the recommendation model may be a SOM, which will organize and categorize all observed actions into an input-output map. In other embodiments, the ML model may be architected differently, for example, with activation nodes that are trained to generate decision weight values on different portions of the input feature vector, which are then ultimately combined to obtain an output action sequence. One example of such a model may be a decision tree (or forest of randomly generated decision trees) that maps the input feature vector to an output action. Depending on the embodiment, the training may be performed on a regular basis, based on observed model performance, or according to user configuration (e.g. training configuration 450). In some embodiments, this model training may be performed by a machine learning service external to the STDR system (e.g. machine learning service 270).

At operation 870, the system executes the recommendation model to recommend different sequences of actions for later instances of security events, via the GUI (e.g. as shown in FIG. 5A). As discussed, the recommended actions may be presented in executable form, so that the user can execute a recommended action sequence without manually performing each individual step in the sequence. In some embodiments, the system may recommend multiple courses of action and rank the multiple action courses based on a priority value. As discussed, the priority value may be generated by the recommendation model and may be based on observation data such as the timing data associated with observed analyst actions, the popularity of other statistical data collected about observed analyst actions, analyst feedback about previous recommendations, and the like. As shown, the training of the recommendation model 860 and the execution of the recommendation model 870 may occur in parallel in an online learning process.

Figure 9:
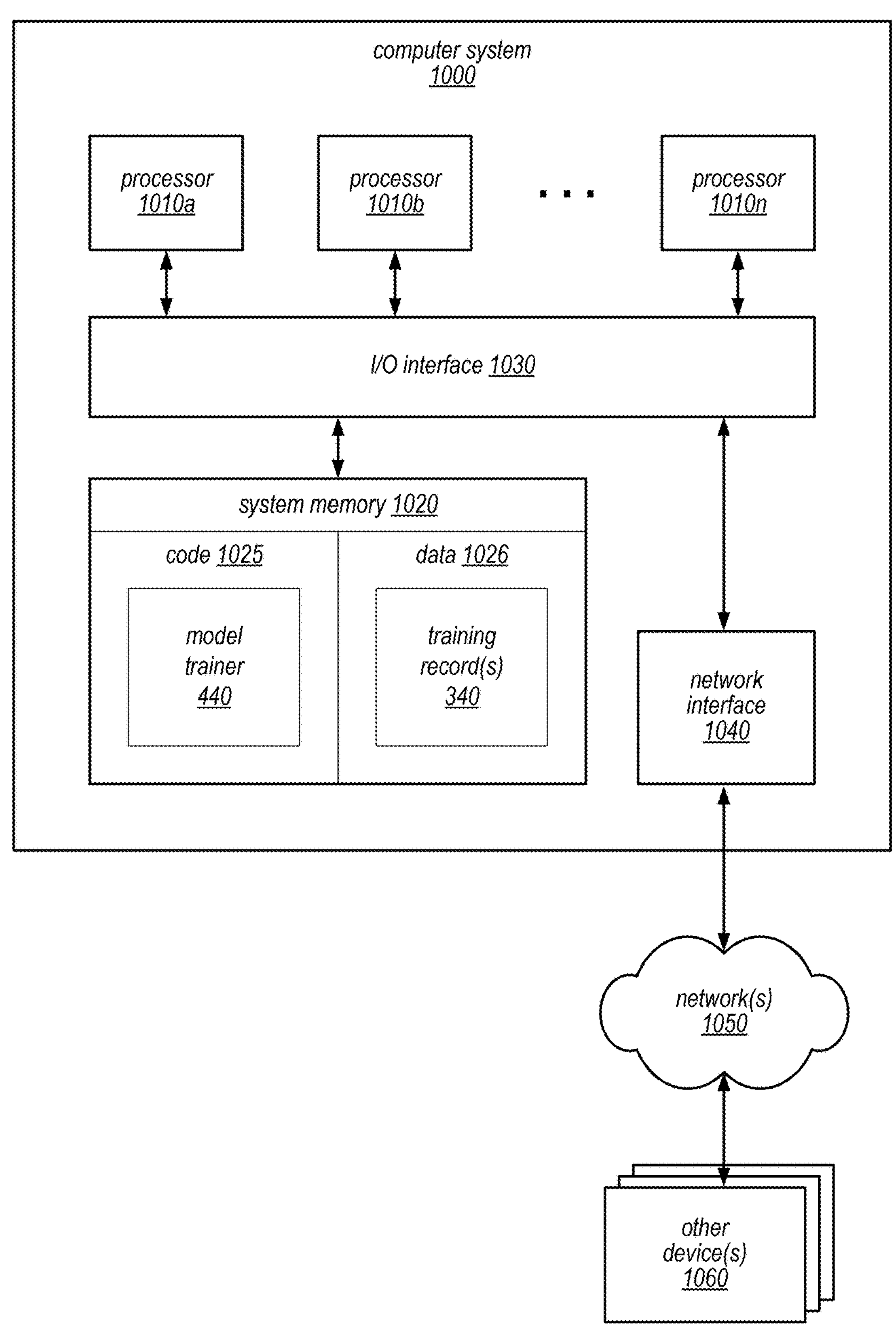
FIG. 9 is a block diagram illustrating an example computer system that can be used to implement one or more portions of a STDR system that uses a ML model to recommend response actions for security events, according to some embodiments.

FIG. 9 is a block diagram illustrating an example computer system that can be used to implement one or more portions of a STDR system 100 that uses a ML model 160 to recommend response actions for security events, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the model trainer 440, as discussed. The system memory 1020 may also be used to store data 1026 needed or produced by the executable instructions. For example, the in-memory data 1026 may be used to store the model training records 340, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:

one or more computer devices that implement a security threat detection and response (STDR) system, configured to:

present, via a graphical user interface (GUI) of the STDR system, a security event detected in a computer network indicating a potential security threat;

record a sequence of actions taken via the GUI in response to the security event;

generate a feature vector that represents the security event;

generate a training record for a machine learning (ML) model based on the feature vector of the security event and the sequence of actions;

train the ML model based on the training record and using one or more ML techniques, so that the ML model is trained to output recommended actions for different types of security events; and execute the ML model to recommend, via the GUI, the sequence of actions for a later instance of the security event.

2. The system of claim 1, wherein:

the STDR system is configured to monitor a plurality of client networks for security threats, including the computer network; and the GUI is implemented at a security operations center (SOC) remote from the client networks.

3. The system of claim 1, wherein the STDR system is configured to:

perform online training of the ML model based on user input received via the GUI while the ML model provides recommended actions for security events.

4. The system of claim 3, wherein the online training changes a recommendation behavior of the ML model to cause the ML model to:

recommend a new action for a type of security event; and change a priority of a particular action for a type of security event.

5. The system of claim 1, wherein the STDR system is configured to:

provide, in the GUI, one or more user control elements to start and stop recording of the action sequence.

6. The system of claim 1, wherein the STDR system is configured to:

enable and disable training of the ML model based on configured parameters, including one or more of:

(a) a performance criterion of the ML model, (b) a list of users whose actions can be used to train the ML model, and (c) a list of security events for which the ML model can be trained.

7. The system of claim 1, wherein the STDR system is configured to:

receive user input specifying a particular action or action sequence to recommend for a particular type of security event.

8. The system of claim 1, wherein:

the GUI is implemented as a web-based interface presented in a web browser; and the sequence of actions includes interactive actions to be taken via the web-based interface.

9. The system of claim 8, wherein the sequence of actions includes one or more of:

(a) a web request in a Hypertext Transport Protocol (HTTP) to read or update one or more web resources, (b) an interaction with a user control element or an area of the web-based interface, (c) a navigation to new webpage in the web-based interface, and (d) a change of a Document Object Model (DOM) data in a webpage in the web-based interface.

10. The system of claim 1, wherein the machine learned model includes a self-organizing map (SOM).

11. A method, comprising:

performing, by a security threat detection and response (STDR) system implemented by one or more computer devices:

presenting, via a graphical user interface (GUI) of the STDR system, a security event detected in a computer network indicating a potential security threat;

recording a sequence of actions taken via the GUI in response to the security event;

generating a feature vector that represents the security event;

generating a training record for a machine learning (ML) model based on the feature vector of the security event and the sequence of actions;

training the ML model based on the training record and using one or more ML techniques, so that the ML model is trained to output recommended actions for different types of security events; and executing the ML model to recommend, via the GUI, the sequence of actions for a later instance of the security event.

12. The method of claim 11, further comprising the STDR system:

recording a user annotation that indicates a description of the sequence of action or individual actions in the sequence; and presenting the user annotation along with the recommendation of the sequence of actions via the GUI.

13. The method of claim 11, further comprising the STDR system:

performing online training of the ML model based on training data recorded via the GUI while the ML model provides recommended actions for security events.

14. The method of claim 13, wherein the training data includes a new action performed for the security event that is not generated from recorded user actions observed via the GUI.

15. The method of claim 13, wherein the training data includes user feedback regarding the recommended sequence of actions.

16. The method of claim 13, wherein the training data includes timing data associated with execution of the recommended sequence of actions.

17. The method of claim 11, further comprising the STDR system:

storing the ML model in a library of models, wherein different models in the library are assigned to different computer networks, different users or user groups of the STDR system, or different categories of security events.

18. The method of claim 11, further comprising the STDR system:

storing the sequence of actions as an action script in a library, wherein individual action scripts in the library are referenced in output of the ML model.

19. The method of claim 18, further comprising the STDR system:

storing a definition of a custom action in the library, wherein the custom action is composed of a plurality of primitive actions executable via the GUI.

20. The method of claim 19, wherein the custom action includes:

looking up a hostname or network address of a machine in the computer network;

executing a query against data about the machine using the hostname or network address; and presenting results of the query via the GUI.

* * * * *